United States Patent
Ichikawa

[19]

[11] Patent Number: 6,159,578
[45] Date of Patent: Dec. 12, 2000

[54] HEXAGONAL-CELL HONEYCOMB STRUCTURE AND METHOD FOR FIXATION THEREOF

[75] Inventor: Yukihito Ichikawa, Nagoya, Japan

[73] Assignee: NGK Insulators, Ltd., Japan

[21] Appl. No.: 09/301,550

[22] Filed: Apr. 29, 1999

[30] Foreign Application Priority Data

May 12, 1998 [JP] Japan ................................. 10-128457

[51] Int. Cl.$^7$ ........................................................ B32B 3/12
[52] U.S. Cl. ........................ 428/118; 428/116; 428/188; 428/593; 502/439; 423/212; 422/168; 422/173; 60/299; 60/300
[58] Field of Search ..................................... 428/116, 118, 428/593, 188; 502/439, 527.19; 422/168, 173; 423/212; 60/299, 300

[56] References Cited

U.S. PATENT DOCUMENTS 4,335,023   6/1982   Dettling et al. .................... 252/466 PT

FOREIGN PATENT DOCUMENTS

| | | |
|---|---|---|
| 9421985 | 9/1997 | Germany . |
| 19704129 | 8/1998 | Germany . |
| 50-77291 | 6/1975 | Japan . |
| 62-225250 | 10/1987 | Japan . |
| 7-39760 | 2/1995 | Japan . |
| 8-193512 | 7/1996 | Japan . |
| WO 95/26463 | 10/1995 | WIPO . |
| WO 98/33592 | 8/1998 | WIPO . |

*Primary Examiner*—Deborah Jones
*Assistant Examiner*—Abraham Bahta
*Attorney, Agent, or Firm*—Parkhurst & Wendel, L.L.P.

[57] ABSTRACT

A hexagonal-cell honeycomb structure having a plurality of cell passages, wherein the sectional shape of each cell is hexagonal and the ratio (C/B) of the average C-axis compression fracture strength (C) and the average B-axis compression fracture strength (B) both of the honeycomb structure is 0.9 or more; and a method for fixing said structure. This hexagonal-cell honeycomb structure is high in mechanical strength, good in purifiability of automobile exhaust gas, and low in pressure loss and therefore can be suitably used particularly as a carrier for catalyst for purification of automobile exhaust gas.

15 Claims, 3 Drawing Sheets

HEXAGONAL-CELL HONEYCOMB STRUCTURE AND METHOD FOR FIXATION THEREOF

BACKGROUND OF THE INVENTION

1. Field of the Invention

The present invention relates to a honeycomb structure suitably used particularly as a carrier for catalyst for purification of automobile exhaust gas, as well as to a method for fixing the honeycomb structure. More particularly, the present invention relates to a hexagonal-cell honeycomb structure of large mechanical strength, good purifiability for exhaust gas and small pressure loss, as well as to a method for fixing the honeycomb structure.

2. Description of Related Art

In recent years, regulation for exhaust gas has been intensified in various countries for reasons of increasing movement for protection of global environment, etc. In this connection, improvements of engine itself have been made to reduce the amount of harmful substances [e.g. hydrocarbons (HC), carbon monoxide (CO) and nitrogen oxides (NOx)] discharged from engines; also, improvements of three-way catalyst (three-way catalysts are currently a main stream of the catalysts for exhaust gas purification) are being continued. Owing to these two improvements, the amount of harmful substances discharged is being steadily decreased.

Thus, the overall amount of harmful substances discharged in ordinary running operation is being reduced. Meanwhile, attention is being paid to the amount of harmful substances discharged right after the start of engine. For example, 60 to 80% of the total harmful substance amount discharged in total running cycles is discharged within 140 seconds from the start of engine when measured according to FTP-75 (regulated running cycles of U.S.), and this level is regarded as a problem.

One reason of the result according to FTP-75 is that right after the start of engine, since the temperature of exhaust gas is low and the catalyst used is not activated sufficiently, the harmful substances in exhaust gas pass through the catalyst without being purified. Another reason is that right after the start of engine, the combustion in engine is not stabilized and the A/F ratio (air-to-fuel ratio) in exhaust gas (which is an important parameter for determining the purifiability of three-way catalyst), i.e. the proportion of oxygen in exhaust gas is under fluctuation.

Catalysts exhibit the highest purifiability when the A/F ratio is a theoretical (stoichiometric) air-to-fuel ratio of 14.7. Therefore, since it is preferable to quickly increase the catalyst temperature of right after the start of engine, it has been attempted to (1) provide a catalyst at a position closer to engine where the temperature of exhaust gas is higher, (2) reduce the heat capacity of honeycomb structure (which is a catalyst carrier), or (3) increase the cell density of honeycomb structure in order to (a) allow the honeycomb structure to absorb the heat of exhaust gas quickly and (b) increase the contact area between catalyst and exhaust gas.

Also, in engines, improvements have been made to allow the A/F ratio to reach a theoretical air-to-fuel ratio as quickly as possible. Meanwhile, in catalysts, it has been conducted for minimization of variation in A/F ratio to add an oxygen-storing substance (e.g. ceria or zirconia) to a noble metal (e.g. platinum, rhodium or palladium) having a catalytic activity, to allow the oxygen-storing substance to adsorb or desorb the oxygen present in exhaust gas.

These noble metals and oxygen-storing substances are present in a dispersed state in the pores of the porous γ-alumina layer formed on the surfaces of the cell partition walls (ribs) of honeycomb structure.

As a specific example of the above improvements, there can be mentioned a honeycomb structure disclosed in JP-A-56-147637, wherein each cell has a triangular, rectangular or hexagonal sectional shape and each cell has a fillet at each angular portion (corner). Also in JP-A-62-225250 is disclosed a honeycomb structure having hexagonal cells having a curve or R (radius: 1 mm or more) at each corner. Further in JP-A-7-39760 is disclosed a hexagonal-cell honeycomb structure wherein the upper and lower limits of bulk density are specified by setting the rib thickness at 0.05 to 0.150 mm and the porosity at 0.65 to 0.95; and in JP-A-8-193512 is disclosed a hexagonal-cell honeycomb structure (rib thickness: 0.17 mm, cell density: 62 cells/cm$^2$) disposed close to an engine.

However, the hexagonal-cell honeycomb structure disclosed in JP-A-56-147637 is intended to avoid the excessive formation of layer (made of γ-alumina or the like) in each corner of each cell and further to achieve the effective contact of exhaust gas with the noble metal loaded on γ-alumina layer. Also, the hexagonal-cell honeycomb structure disclosed in JP-A-62-225250 is intended to avoid the peeling of the layer excessively formed in each corner of each cell, which may taken place owing to impact or thermal change; however, there is no description, in the Examples, on the rib thickness and cell density of the hexagonal-cell honeycomb structure.

Meanwhile, in the invention of hexagonal-cell honeycomb structure disclosed in JP-A-7-39760, it is intended to reduce the pressure loss by increasing the porosity, and quickly elevate the temperature of catalyst at the start of engine by decreasing the heat capacity of carrier. Also, in JP-A-8-193512, it is described that by disposing a hexagonal-cell honeycomb structure (which is superior in thermal impact resistance to a triangular- or rectangular-cell honeycomb structure) at a position close to engine (where the exhaust gas temperature is high), the warm-up property of catalyst can be improved. In the literature, it is also described that a triangular- or rectangular-cell honeycomb structure is preferred as a carrier for catalyst to be disposed at a position distant from engine, because such a honeycomb structure, as compared with a hexagonal-cell honeycomb structure, has a large GSA (geometric surface area) at the same cell density and, after the completion of warm-up, has high purifiability for exhaust gas.

Thus, the past improvements of catalysts were made in view of the purifiability for exhaust gas or the durability of catalytic performance and paid no attention to the strength of honeycomb structure, etc. Conventional honeycomb structures have consisted mainly of three kinds, i.e. triangular-cell, rectangular-cell and hexagonal-cell types.

Of these, a rectangular-cell type, particularly a square-cell type is used in a highest proportion. It is mainly because the square-cell type, as compared with other types, is well balanced in purifiability, pressure loss and strength and the die used in extrusion molding of square-cell honeycomb structure is easy to produce. These three types of honeycomb structures are ranked as shown in Table 1, when compared under the conditions of same rib thickness and same cell density.

TABLE 1

| Cell Shape | Purifiability | Pressure loss | Mechanical Strength | Thermal shock resistance | Overall rating |
|---|---|---|---|---|---|
| Triangular | ◯ | X | ◯ | Δ | X |
| Rectangular | ◎ | ◯ | ◯ | ◯ | ◯ |
| Hexagonal | ◎ | ◎ | Δ | ◎ | Δ |

◎: excellent  ◯: good  X: bad

Hexagonal-cell honeycomb structures are about equal to square-cell honeycomb structures in purifiability and superior to the latter in pressure loss; however, the former have low stiffness and low strength. Therefore, hexagonal-cell honeycomb structures have found no practical application as a carrier for catalyst for purification of automobile exhaust gas and their practical applications have been limited to stationary apparatuses requiring no large strength, such as carrier for catalyst for deodorization.

SUMMARY OF THE INVENTION

The present invention has been completed in view of the above-mentioned problems of the prior art and has an object of providing a hexagonal-cell honeycomb structure usable as a carrier for catalyst for purification of automobile exhaust gas, by improving the strength of hexagonal-cell honeycomb structure and further by developing an improved method for fixation of hexagonal-cell honeycomb structure where the anisotropy in strength distribution is utilized.

According to the present invention there is provided a hexagonal-cell honeycomb structure having a plurality of cell passages, wherein the sectional shape of each cell is hexagonal and the ratio (C/B) of the average C-axis compression fracture strength (C) and the average B-axis compression fracture strength (B) both of the honeycomb structure is 0.9 or more.

According to the present invention there is also provided a hexagonal-cell honeycomb structure having a plurality of cell passages, wherein the sectional shape of each cell is hexagonal and the partition wall angle θ of each cell is in the range of 30°<θ<45°. In this hexagonal-cell honeycomb structure, the partition wall angle θ of each cell is preferably in the range of 35°<η<40°.

The hexagonal-cell honeycomb structure of the present invention is preferably made from a ceramic material selected from the group consisting of cordierite, alumina, mullite, silicon nitride, silicon carbide and zirconia, or from a heat-resistant steel. The heat-resistant steel is preferably stainless steel.

According to the present invention there is also provided a method for fixing a hexagonal-cell honeycomb structure having a plurality of cell passages of hexagonal sectional shape, which method comprises fixing the structure at the circumference mainly in the C-axis direction when the partition wall angle of each cell is larger than 30°. Preferably, the hexagonal-cell honeycomb structure has an oval shape in its section normal to the direction of each cell passage and the C-axis direction of the structure is identical to the minor axis direction of the oval shape.

According to the present invention there is also provided a method for fixing a hexagonal-cell honeycomb structure having a plurality of cell passages of hexagonal sectional shape, which method comprises fixing the structure at the circumference mainly in the B-axis direction when the partition wall angle of each cell is 30° or smaller. Preferably, the hexagonal-cell honeycomb structure has an oval shape in its section normal to the direction of each cell passage and the B-axis direction of the structure is identical to the minor axis direction of the oval shape.

The hexagonal-cell honeycomb structure of the present invention is used as a carrier for catalyst for purification of automobile exhaust gas, is fixed by the above-mentioned fixation method, and is disposed in the exhaust pipe of automobile.

BRIEF DESCRIPTION OF THE DRAWINGS

In FIGS. 1 and 2, numeral 1 refers to a hexagonal-cell honeycomb; numeral 2 refers to a partition wall of cell; numeral 3 refers to a hexagonal cell; numeral 4 refers to a square cell; numeral 5 refers to a triangular cell; numeral 6 refers to a γ-alumina layer formed by coating; and numeral 7 refers to a vertex.

DESCRIPTION OF PREFERRED EMBODIMENTS

According to the hexagonal-cell honeycomb structure (hereinafter referred to as hexagonal-cell honeycomb) and the method for fixation thereof, both of the present invention, it is possible to fix a hexagonal-cell honeycomb of improved mechanical strengths stably. Therefore, when the hexagonal-cell honeycomb is used particularly as a carrier for catalyst for purification of automobile exhaust gas, excellent durability, high purifiability and low pressure loss can be obtained.

Embodiments of the present invention are described below.

Figure 1:
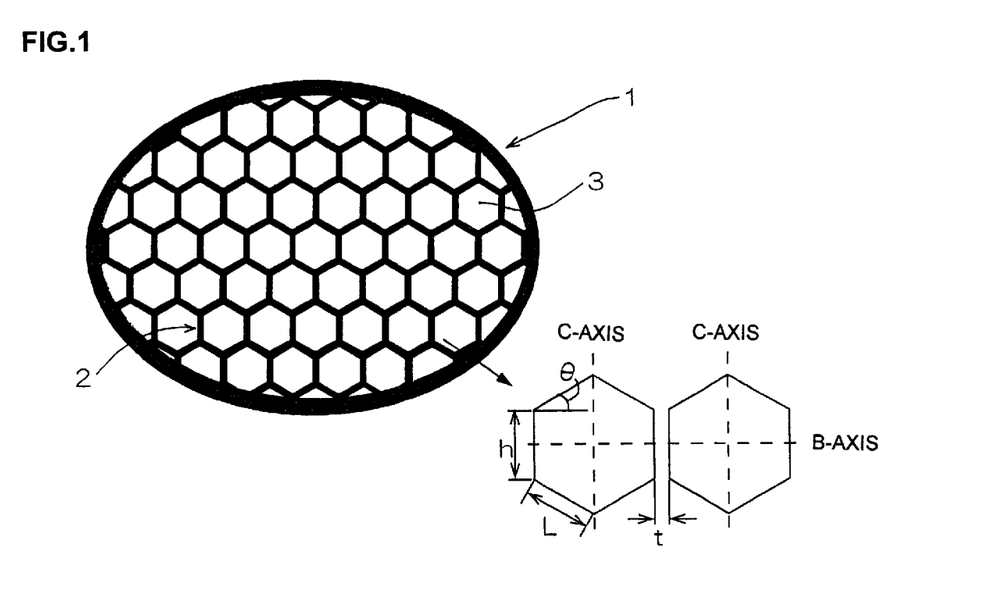
FIG. 1 is a sectional view of an embodiment of the hexagonal-cell honeycomb structure of the present invention, showing a plane perpendicular to the cell passages.

In FIG. 1 is shown a sectional view of an embodiment of the hexagonal-cell honeycomb of the present invention. A hexagonal-cell honeycomb 1 has partition walls 2 separating a plurality of cells (passage cells) 3, and each cell 3 has a hexagonal sectional shape (the cell 3 is a hexagonal cell). Here, the parameters for determining the shape of each hexagonal cell 3 are, as shown in a partially enlarged view of FIG. 1, partition wall angle θ, partition wall thickness t, and partition wall lengths h and L. The partition wall angle θ is an angle formed by (1) one side of the hexagonal cell 3 intersecting the C-axis of the honeycomb and (2) the B-axis of the honeycomb. Therefore, when the cell 3 has a regular hexagonal section as shown in FIG. 1, θ is 30° and the aspect ratio (h/L) of the partition wall lengths is 1. The definitions of the B-axis and the C-axis are given later.

In the hexagonal-cell honeycomb 1 of the present invention, it is not necessarily required that the cell shape is a regular hexagon. The cell shape may be such a hexagonal shape that a plurality of hexagons can be packed in a close state, that is, one pair of sides facing each other length h may be longer or shorter than other sides length L.

Figure 2:
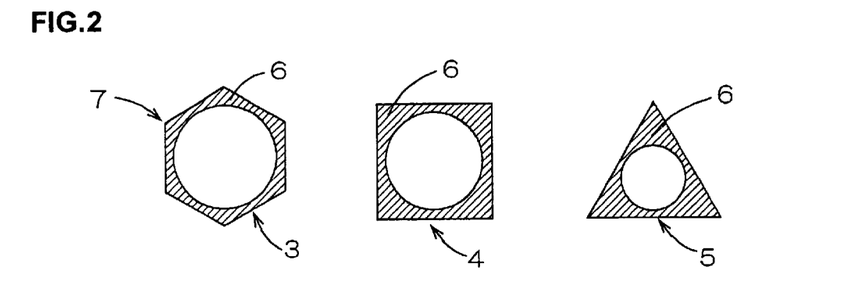
FIG. 2 is drawings showing various cell shapes of honeycomb structure, the hydraulic diameters of such cells, and the catalyst layers formed on the wall partitions of such cells.

In such a hexagonal cell 3, each vertex 7 has an obtuse angle as shown in FIG. 2 and the γ-alumina catalyst layer 6 (hereinafter referred to as "coat layer 6") formed on each partition wall 2 by coating has a uniform thickness, as compared with those in a triangular cell 5 or a rectangular cell 4; as a result, a purification catalyst as a whole can contact effectively with an exhaust gas and the catalyst can exhibit high purifiability. Moreover, in the hexagonal cell 3, since the hydraulic diameter R is large, low pressure loss is obtained.

Further in the hexagonal cell, the coat layer 6 can be formed uniformly; as a result, the heat of exhaust gas is conducted through the coat layer 6 uniformly and reaches each cell partition wall 2; thereby, the temperature of hexagonal-cell 1 is elevated quickly and uniformly and an improved warm-up property is obtained. Furthermore, since the coat layer per se is heated quickly and uniformly, the catalyst component present in the coat layer 6 in a dispersed state can exhibit its activity uniformly, whereby the warm-up property of catalyst is improved and higher purifiability is obtained.

In recent years, it was developed to form a catalyst layer in a two- or more-layer structure and allow each catalyst layer to contain a different catalyst component, for improvement of catalytic performance and suppression of catalyst deterioration. In a two- or more-layer catalyst structure, the thickness uniformity of each catalyst layer is believed to largely affect the activity of catalyst. A catalyst layer closer to the partition wall 2, i.e. a lower catalyst layer, as compared with a catalyst layer facing a cell passage through which an exhaust gas passes, i.e. an upper layer, is distant from the exhaust gas; therefore, the lower catalyst layer is slower in temperature elevation than the upper catalyst layer and takes a longer time until it begins to show a catalytic activity. The meritorious effect of the uniform thickness of coat layer 6 in hexagonal-cell honeycomb will appear not only to a three-way catalyst but also to various other catalysts such as zeolite type, metal type and the like. Hence, the hexagonal-cell honeycomb is superior in this respect as well.

Next, description is made on the mechanical properties of the hexagonal-cell honeycomb 1. In general, the mechanical strengths of a honeycomb structure are evaluated by the compression fracture strength in the axis direction and the isostatic strength. Here, the compression fracture strength is a mechanical property required for a honeycomb structure as a mechanical structural member, and the JASO Standard M 505-87 (which is a standard for automobile issued by Society of Automobile Engineers of Japan) specifies that a square-cell honeycomb structure must be tested for compression fracture strength in each of the A-axis, B-axis and C-axis.

For a hexagonal-cell honeycomb, however, the definition of each axis is not given in the above JASO Standard. Hence, the A-axis, B-axis and C-axis of the present hexagonal-cell honeycomb 1 are defined as follows. The C-axis is such an axis that is formed by connecting a pair of vertexes of hexagonal cell 3 in the plane of sectional view of the hexagonal-cell honeycomb 1, facing each other and that each hexagonal cell 3 becomes symmetrical with respect to the axis. The B-axis is such an axis that when the A-axis is taken as a direction of cell passage 3, i.e. a direction perpendicular to the section of cell 3, becomes perpendicular to both the A-axis and the C-axis.

When the A-axis, B-axis and C-axis are defined as above, the B-axis compression fracture strength of the hexagonal-cell honeycomb 1 is a value obtained when a columnar sample of 25.4 mm in diameter and 25.4 mm in length (whose end is parallel to the A-C plane and whose length direction is parallel to the B-axis) is cut out from the hexagonal-cell honeycomb 1, the sample is compressed in the B-axis direction, and the load at fracture is divided by the area of compression; the C-axis compression fracture strength is a value obtained when a columnar sample of 25.4 mm in diameter and 25.4 mm in length (whose end is parallel to the A-B plane and whose length direction is parallel to the C-axis) is cut out from the hexagonal-cell honeycomb 1, the sample is compressed in the C-axis direction, and the load at fracture is divided by the area of compression; and the A-axis compression fraction strength is a value obtained when a columnar sample of 25.4 mm in diameter and 25.4 mm in length (whose end is parallel to the B-C plane and whose length direction is parallel to the A-axis) is cut out from the hexagonal-cell honeycomb 1, the sample is compressed in the A-axis direction, and the load at fracture is divided by the area of compression.

A carrier for catalyst for purification of automobile exhaust gas is ordinarily fixed at the circumference and used in the exhaust pipe of engine. Therefore, the isostatic fracture strength of the carrier is an important property for determining whether the carrier has a sufficient strength and durability to the pressure of fixation. The isostatic fracture strength is evaluated by placing a carrier in a rubber-made cylindrical vessel, placing an aluminum-made cover thereon, and subjecting the carrier to isotropic compression in water. This test simulates the compression load which a carrier for catalyst undergoes when fixed to a casing of converter at the circumference. The isostatic fracture strength of carrier is indicated as a pressure applied at which the carrier shows fracture in the above test, and is specified by the JASO Standard M 505-87 issued by Society of Automotive Engineers of Japan.

As to these fracture strengths, there is a clear correlation between (a) the ratio (C/B) of C-axis compression fracture strength (C) and the B-axis compression fracture strength (B) and (b) isostatic fracture strength, as shown in Examples described later. The compression fracture strength ratio (C/B) is preferably 0.9 or more in view of the isostatic fraction strength.

The ratio of average C-axis compression fracture strength and average B-axis compression fracture strength become larger as the partition wall angle θ become larger, and both the C-axis compression fracture strength and the isostatic fracture strength become larger. The isostatic fracture strength, however, tends to decrease when the partition wall angle θ is too large. Thus, the balance between C-axis compression fracture strength and B-axis compression fracture strength has a large influence on the improvement of isostatic fracture strength and, by making the partition wall angle θ larger than 30° (regular hexagon), both the C-axis compression fracture strength and the isostatic fracture strength can be improved. The partition wall angle θ is preferably in the range of 30°<θ<45°, more preferably in the range of 35°<θ<40° in view of the isostatic fracture strength.

In the present invention, the hexagonal-cell honeycomb 1 is preferably made from a ceramic material selected from the group consisting of cordierite, alumina, mullite, silicon nitride, silicon carbide and zirconia, or from a heat-resistant steel, particularly stainless steel. Since the mechanical properties of the hexagonal-cell honeycomb 1 are considered to originate from the geometric properties of hexagonal cell 3, a preferred partition wall angle θ, a preferred compression fracture strength ratio (C/B), etc. can be considered to be universal parameters for mechanical strengths, irrelevant to the process or material used in production of hexagonal-cell honeycomb, although the mechanical strengths per se differ depending upon the material used.

The hexagonal-cell honeycomb of the present invention is low in pressure loss and superior in mechanical properties and, when a coat layer has been formed thereon, shows excellent purifiability for exhaust gas; therefore, it can be suitably used particularly as a carrier for catalyst for purification of automobile exhaust gas. The hexagonal-cell honeycomb of the present invention can be used also for other applications where the honeycomb structure need be fixed by an appropriate external force, such as carrier for catalyst for purification of various exhaust gases, filter for removal of fine particles in various exhaust gases, filter for filtration of various liquids, carrier for catalyst for various chemical reactions, and the like.

Next, description is made on the method for fixation of the present hexagonal-cell honeycomb. When the present hexagonal-cell honeycomb is used as a carrier for catalyst for exhaust gas purification, the honeycomb is fixed to a casing at the circumference and used as a converter. When the cell partition wall angle θ of the honeycomb is larger than 30°, the C-axis compression fracture strength of the honeycomb is larger than the B-axis compression fracture strength and, therefore, the hexagonal-cell honeycomb is preferably fixed at the circumference mainly in the C-axis direction. Hence, when the hexagonal-cell honeycomb has an oval shape in its B-C plane perpendicular to the passage direction of hexagonal cell, the C-axis direction of the hexagonal-cell honeycomb is allowed to be identical to the minor axis direction of the oval and the hexagonal-cell honeycomb is fixed in the C-axis direction, whereby the honeycomb can be fixed stably and strongly and has high reliability.

When the cell partition wall angle θ of the honeycomb is 30° or smaller, the B-axis compression fracture strength of the honeycomb is larger than the C-axis compression fracture strength as shown in Examples described later and, therefore, the hexagonal-cell honeycomb is preferably fixed at the circumference mainly in the B-axis direction. Hence, when the hexagonal-cell honeycomb has an oval shape in its B-C plane, the B-axis direction of the hexagonal-cell honeycomb is allowed to be identical to the minor axis direction of the oval and the hexagonal-cell honeycomb is fixed in the B-axis direction, whereby the honeycomb can be fixed stably and strongly.

In any case of the above fixations in the C-axis and in the B-axis, the shape of the hexagonal-cell honeycomb in its B-C plane is not restricted to oval and may also be any of circle, rectangle and polygon. No matter what shape the hexagonal-cell honeycomb has, the direction of fixation can be determined depending upon the shape (partition wall angle θ) of each hexagonal cell constituting the honeycomb.

The present invention is hereinafter described in more detail by way of Examples.

A kneaded raw material consisting of talc, kaolin, alumina, etc. was subjected to extrusion molding, followed by drying and firing, to produce various hexagonal-cell honeycombs made of cordierite. The honeycombs were tested. In Table 2 are shown various parameters for specifying the shapes of these hexagonal honeycombs. In Table 2, "cell density: 600 cpsi" indicates that 600 cells are present per square inch.

TABLE 2

| Hexagonal-cell honeycomb | Partition wall thickness (mm) | Cell density (cpsi) | Porosity (%) | Honeycomb size [dia. (mm) × length (mm)] | Average compression fracture strength (MPa) | | | Average isostatic fracture strength (MPa) |
|---|---|---|---|---|---|---|---|---|
| | | | | | A-axis | B-axis | C-axis | |
| Example1 | 0.15 | 460 | 77.5 | φ125 × 150 | 31.1 | 0.52 | 0.48 | 5.6 |
| Example2 | 0.15 | 400 | 78.9 | φ125 × 150 | 29.6 | 0.47 | 0.60 | 6.5 |
| Example3 | 0.10 | 600 | 82.6 | φ110 × 150 | 24.3 | 0.33 | 0.40 | 6.0 |
| Example4 | 0.10 | 500 | 84.0 | φ110 × 150 | 21.6 | 0.29 | 0.28 | 4.0 |
| Example5 | 0.10 | 400 | 85.7 | φ125 × 150 | 20.3 | 0.24 | 0.24 | 4.5 |
| Example6 | 0.10 | 400 | 85.7 | φ70 × 100 | 22.1 | 0.28 | 0.32 | 4.9 |
| Example7 | 0.10 | 400 | 85.7 | φ60 × 90 | 22.4 | 0.28 | 0.33 | 7.0 |
| Example8 | 0.08 | 400 | 88.6 | φ105 × 110 | 15.7 | 0.19 | 0.15 | 3.3 |
| Comparative Example1 | 0.10 | 500 | 84.0 | φ110 × 150 | 23.6 | 0.35 | 0.29 | 0.7 |
| Comparative Example2 | 0.10 | 400 | 85.7 | φ125 × 150 | 17.5 | 0.25 | 0.21 | 0.5 |
| Comparative Example3 | 0.10 | 400 | 85.7 | φ105 × 110 | 17.7 | 0.25 | 0.22 | 2.3 |
| Comparative Example4 | 0.10 | 400 | 85.7 | φ105 × 110 | 20.0 | 0.25 | 0.19 | 2.5 |
| Comparative Example5 | 0.08 | 900 | 83.2 | φ50 × 100 | 28.5 | 0.49 | 0.35 | 1.4 |
| Comparative Example6 | 0.08 | 600 | 86.2 | φ125 × 150 | 19.6 | 0.21 | 0.15 | 0.7 |
| Comparative Example7 | 0.08 | 400 | 88.6 | φ125 × 150 | 15.4 | 0.19 | 0.13 | 0.3 |
| Comparative Example8 | 0.06 | 600 | 89.5 | φ50 × 100 | 14.7 | 0.12 | 0.10 | 0.7 |
| Comparative Example9 | 0.06 | 900 | 87.2 | φ50 × 100 | 18.0 | 0.35 | 0.26 | 0.8 |

Honeycomb structures used as a carrier for catalyst for purification of automobile exhaust gas are required to have a catalyst-loadability, i.e. a coat layer-formability and further be superior in three fundamental properties to be possessed by such a structure, i.e. compression fracture strength, isostatic fracture strength and thermal impact resistance. Hence, each of the hexagonal-cell honeycombs produced above was tested for compression fracture strength, isostatic fracture strength and thermal impact resistance on 5 or 10 samples, and an average of 5 or 10 measurements was determined on each test item. The results are shown in Table 2.

Here, the test for compression fracture strength was conducted for each of the A-axis, B-axis and C-axis defined previously for the hexagonal-cell honeycomb of the present invention, according to the specification made for square-cell honeycomb structures in the JASO Standard M 505-87 issued by Society of Automotive Engineers of Japan. The B-axis compression fracture strength of hexagonal-cell honeycomb is a value obtained when a columnar sample of 25.4 mm in diameter and 25.4 mm in length (whose end is parallel to the A-C plane and whose length direction is parallel to the B-axis) is cut out from the hexagonal-cell honeycomb, the sample is compressed in the B-axis direction, and the load at fracture is divided by the area of compression. The A-axis compression fracture strength and the C-axis compression fracture strength can be obtained similarly.

The test for isostatic fracture strength was conducted according to the JASO Standard M 505-87 issued by Society of Automotive Engineers of Japan. The test for thermal impact resistance is specified basically by the JASO Standard M 505-87, and was conducted as follows. A honeycomb structure of room temperature was placed in an electric furnace kept at a predetermined temperature higher than room temperature, for 20 minutes; then, the honeycomb structure was taken out onto a firebrick; and the honeycomb structure was observed for appearance (to check the formation of cracks) and lightly tapped at the circumference with a metal stick. When no crack was observed and the sound was a metallic sound and not a thick sound, the result was "pass". Then, the inside temperature of the electric furnace was raised at intervals of 50° C. and the same procedure was repeated until "fail" was reached. Hence, when "fail" is reached at a temperature of (room temperature +950° C.), the thermal impact resistance of the honeycomb structure tested is reported as "900° C. difference".

Next, description is made on the test results. First, the die for extrusion molding used in the above production of hexagonal-cell honeycombs had a slit (for honeycomb molding) which was a strictly regular hexagon and which had been processed at an accuracy of smaller than ±0.5° in terms of angle.

In each hexagonal-cell honeycomb actually produced, however, there were deformed portions formed by very slight collapse of cells in the C-axis direction. This is presumed to take place because, when a raw material is passed through a slit of die, a hexagonal-cell honeycomb structure is produced, and the produced honeycomb structure is supported by a jig at the circumference, the circumference and the cell partition walls in its vicinity, of the honeycomb structure are deformed by the own weight of the honeycomb structure.

It is thought that the above deformed portions are formed also when other ceramic material (e.g. alumina, mullite, silicon nitride, silicon carbide or zirconia) or a sintered metal material (e.g. heat-resistant stainless steel) is subjected to extrusion molding. That is, it is thought that, when a material obtained by mixing and kneading a raw material powder, water and a binder is subjected to extrusion molding, the resulting hexagonal-cell honeycomb has deformation of partition wall irrelevantly to the material used.

A regular hexagonal-cell honeycomb theoretically has isotropic stiffness. Hence, it was anticipated that the B-axis compression fracture strength and the C-axis compression fracture strength of each hexagonal-cell honeycomb produced were equal. However, the result was that, in more than half of the honeycomb samples tested, the C-axis compression fraction strength was smaller than the B-axis compression fracture strength. Meanwhile, observation of the honeycomb samples after the isostatic fracture strength test indicated that, in each of samples relatively small in isostatic fracture strength, several cells were collapsed and deformed in the C-axis direction. Therefore, it is considered that the cell collapse and deformation in C-axis direction affects the C-axis compression fracture strength.

In the isostatic fracture strength test for hexagonal-cell honeycomb, a pressure is applied to the circumference of the honeycomb; therefore, it is easily inferred that the isostatic fracture strength of honeycomb has a large relation to both the B-axis compression fracture strength and the C-axis compression fracture strength of the honeycomb. From the above test results, however, it is considered that in hexagonal-cell honeycombs, deformation and fracture tends to appear owing to the load of the C-axis direction rather than the load of the B-axis direction.

Figure 3:
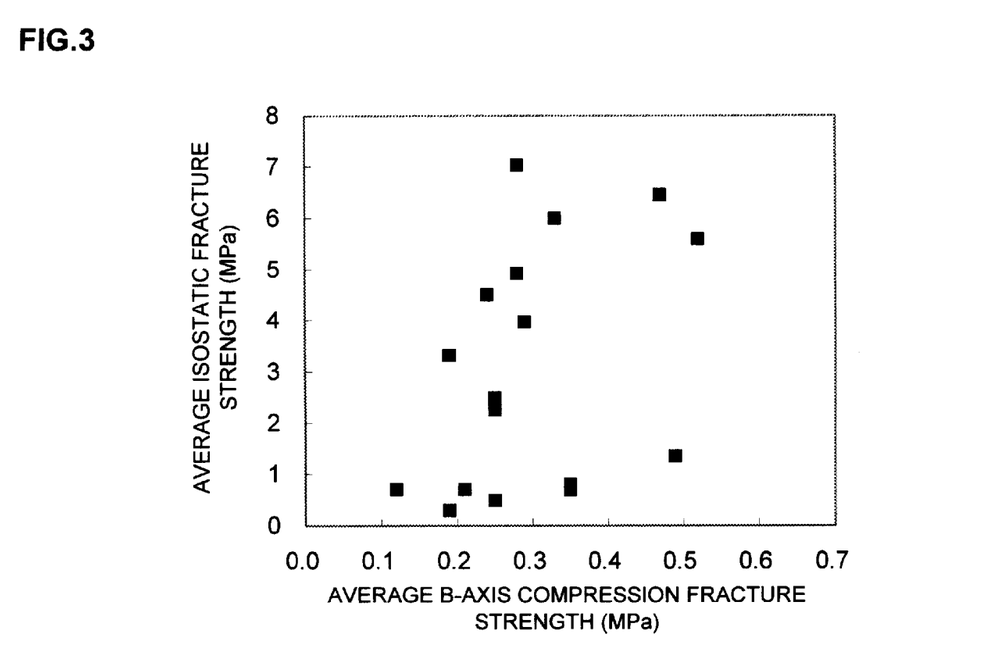
FIG. 3 is a graph showing the relationships between B-axis compression fracture strength and isostatic fracture strength, obtained in Examples and Comparative Examples.
Figure 4:
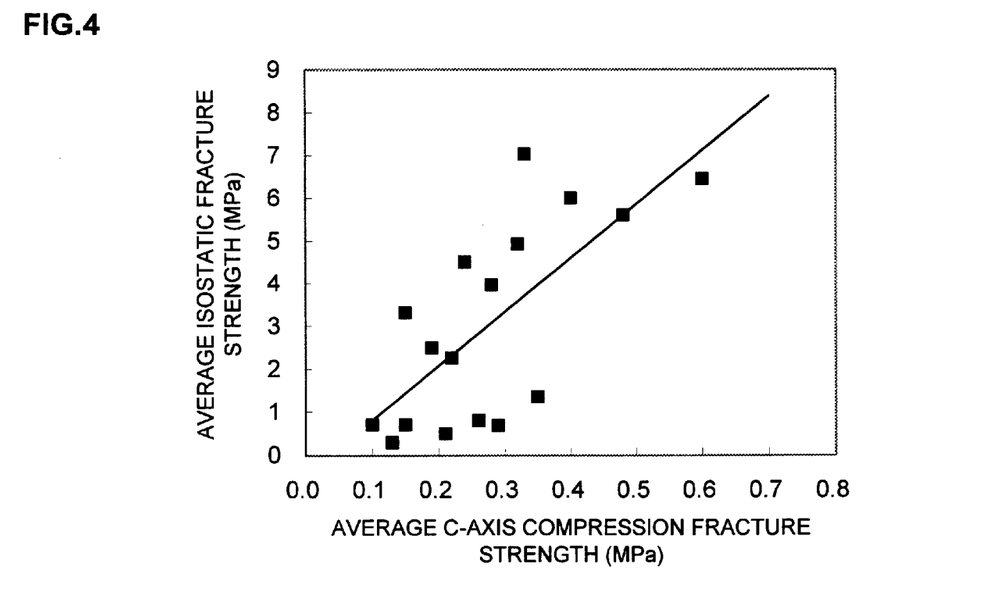
FIG. 4 is a graph showing the relationships between C-axis compression fracture strength and isostatic fracture strength, obtained in Examples and Comparative Examples.
Figure 5:
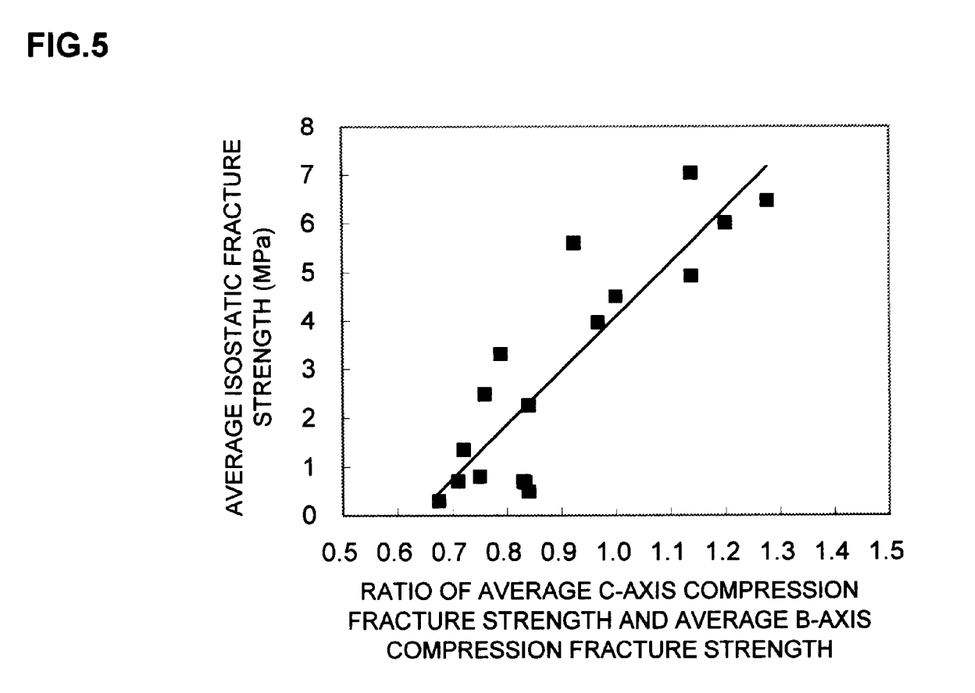
FIG. 5 is a graph showing the relationships between (a) ratio of C-axis compression fracture strength and B-axis compression fracture strength and (b) isostatic fracture strength, obtained in Examples and Comparative Examples.

Hence, an investigation was made, using the test results of Table 2, on the relationship between B-axis compression fracture strength, C-axis compression fracture strength and isostatic fracture strength. As a result, as shown in FIGS. 3 to 5, there was no clear relationship between B-axis compression fracture strength and isostatic fracture strength; there was a positive (although unclear) relationship between C-axis compression fracture strength and isostatic fracture strength; and there was a clear positive relationship between (a) the ratio of C-axis compression fracture strength and B-axis compression fracture strength and (b) isostatic fracture strength.

Carriers for catalyst for purification of automobile exhaust gas have, in general, such a structure that is fixed at the circumference; therefore, the fixation pressure applied thereto is set at 0.5 MPa, preferably 1.0 MPa in terms of minimum guaranteed level. In this connection, the average level of isostatic fracture strength required for a carrier for catalyst for purification of automobile exhaust gas is 3.0 MPa or more, desirably 4.0 MPa or more. Accordingly, from the results of the above test (see FIG. 5), the lower limit of the compression fracture strength ratio (C/B) when the isostatic fracture strength exceeds 3 MPa, is judged to be 0.9; and a C/B value of 0.9 or more is preferred in view of the mechanical strengths of hexagonal-cell honeycomb.

While the results of the thermal impact resistance test are not shown in Table 2, all the tested honeycomb structures of various cell shapes gave 850 to 900° C. differences and there was no significant difference between the samples. The temperature of exhaust gas is becoming higher year by year and the requirement for the thermal impact resistance of honeycomb structure is becoming severer. Under such a circumstance, the thermal impact resistance currently required for practical purpose is at least 750° C. difference, desirably at least 800° C. difference. It was confirmed that the hexagonal-cell honeycombs tested met the above thermal impact resistance level required for practical purpose.

From the results of the above test, it was learned that the B-axis compression fracture strength, C-axis compression fracture strength and isostatic fracture strength of hexagonal-cell honeycomb originated from a geometric reason of cell's hexagonal shape and that these properties were universal parameters for mechanical strengths, irrelevant to the process and material used in production of hexagonal-cell honeycomb. Hence, investigation was made on the effect of cell shape on the mechanical strengths of honeycomb structure. That is, there were produced, by extrusion molding, various hexagonal-cell cordierite honeycombs which were the same in partition wall thickness, cell density and size but which had various partition wall angles $\theta$ of hexagonal cell, each larger or smaller than 30° (regular hexagon) (therefore, the hexagonal cells in each honeycomb had a shape deformed in the C-axis direction); each honeycomb was tested for (a) ratio of average C-axis compression fracture strength and average B-axis compression fracture strength and (b) isostatic fracture strength, in the same manner as in the above. The results are shown in Table 3.

As described above, the hexagonal-cell honeycomb structure of the present invention is improved in mechanical strengths and, when used as a carrier for catalyst for purification of automobile exhaust gas, shows excellent durability, high purifiability and low pressure loss. Further, by employing the present method for fixation of hexagonal-cell honeycomb depending upon the anisotropy of mechanical strengths and the partition wall angle both determined by the cell shape, it is possible to fix a hexagonal-cell honeycomb stably and strongly, and the fixed honeycomb can have higher reliability as a catalyst carrier.

What is claimed is:

1. A hexagonal-cell honeycomb structure comprising a matrix of partition walls forming therebetween a plurality of adjacent elongate call passages, wherein the cross-sectional shape of each cell is hexagonal, a C-axis direction in a plans of a cross-section of said structure and crossing the cross-sectional area of an

TABLE 3

| Hexagonal-cell honeycomb | Partition wall thickness (mm) | Cell density (cpsi) | Honeycomb size [dia. (mm) × length (mm)] | Partition wall angle $\theta$ (°) | Ratio of average C-axis compression fracture strength and average B-axis compression fracture strength | Average isostatic fracture strength (MPa) |
|---|---|---|---|---|---|---|
| Example9 | 0.10 | 400 | φ125 | 30 | 0.87 | 2.6 |
| Example10 | | | × | 33 | 1.01 | 3.7 |
| Example11 | | | 150 | 36 | 1.25 | 5.2 |
| Example12 | | | | 39 | 1.35 | 4.8 |
| Example13 | | | | 42 | 1.43 | 2.9 |
| Comparative Example10 | | | | 24 | 0.69 | 0.4 |
| Comparative Example11 | | | | 27 | 0.81 | 0.7 |
| Comparative Example12 | | | | 45 | 1.53 | 1.8 |

As the partition wall angle $\theta$ was larger, the ratio of average C-axis compression fracture strength and average B-axis compression fracture strength was larger and both the C-axis compression fracture strength and the isostatic fracture strength were larger; however, when the partition wall angle $\theta$ was too large, the isostatic fracture strength tended to decrease. From this result, a balance between C-axis compression fracture strength and B-axis compression fracture strength is important for a large isostatic fracture strength, and a partition wall angle $\theta$ larger than 30° (regular hexagon) can increase the C-axis compression fracture strength and the isostatic fracture strength. From the results of this test, the partition wall angle $\theta$ is preferably in the range of $30°<\theta<45°$, more preferably in the range of $35°<\theta<40°$ in view of the isostatic fracture strength.

When the partition wall angle $\theta$ is larger than 30°, the C-axis compression fracture strength is larger than the B-axis compression fracture strength; therefore, when a honeycomb structure is fixed at the circumference, the fixation is preferably made mainly in the C-axis direction. When a hexagonal-cell honeycomb has, for example, an oval shape in its B-C plane, it is preferred that the C-axis is made identical to the minor axis direction of the oval and the force applied for fixation is received mainly in the C-axis direction.

When the partition wall angle $\theta$ is 30° (regular hexagon) or smaller, the B-axis compression fracture strength is larger than the C-axis compression fracture strength; therefore, it is easily inferred that fixation of honeycomb structure is made in the B-axis direction and the resulting honeycomb structure has higher reliability.

hexagonal cell from one partition wall junction to another partition wall junction substantially diametrically opposite said one junction across the area of said hexagonal cell, and a B-axis direction also lying in said plane and perpendicular to said C-axis direction, and the ratio (C/B) of the average C-axis compression fracture strength (C) and the average B-axis compression fracture strength (B) of the honeycomb structure being 0.9 or more.

2. A hexagonal-cell honeycomb structure according to claim 1, wherein the partition wall angle $\theta$ in said plane and between a partition wall of a hexagonal cell of said structure and the B-axis direction of each cell is in the range of $30°<\theta<45°$.

3. A hexagonal-cell honeycomb structure according to claim 2, wherein the partition wall angle $\theta$ of each cell is in the range of $35°<\theta<40°$.

4. A hexagonal-cell honeycomb structure according to claim 1, comprising a ceramic material selected from the group consisting of cordierite, alumina, mullite, silicon nitride, silicon carbide and zirconia, or from a heat-resistant steel.

5. A hexagonal-cell honeycomb structure according to claim 2, comprising a ceramic material selected from the group consisting of cordierite, alumina, mullite, silicon nitride, silicon carbide and zirconia, or from a heat-resistant steel.

6. A hexagonal-cell honeycomb structure according to claim 4, wherein the heat-resistant steel is stainless steel.

7. A hexagonal-cell honeycomb structure according to claim 5, wherein the heat-resistant steel is stainless steel.

8. A hexagonal-cell honeycomb structure according to claim 1, which is used as a carrier for catalyst for purification of automobile exhaust gas.

9. A hexagonal-cell honeycomb structure according to claim 2, which is used as a carrier for catalyst for purification of automobile exhaust gas.

10. A method for fixing a hexagonal-cell honeycomb structure having a plurality of cell passages of hexagonal sectional shape to a casing, which method comprises fixing the structure at the circumference mainly in the C-axis direction when the partition wall angle of each cell is larger than 30°.

11. A method for fixing a hexagonal-cell honeycomb structure according to claim 10, wherein the hexagonal-cell honeycomb structure has an oval shape in its section normal to the direction of each cell passage and the C-axis direction of the structure is identical to the minor axis direction of the oval shape.

12. A method for fixing a hexagonal-cell honeycomb structure having a plurality of cell passages of hexagonal sectional shape, which method comprises fixing the structure at the circumference mainly in the B-axis direction when the partition wall angle of each cell is 30° or smaller.

13. A method for fixing a hexagonal-cell honeycomb structure according to claim 12, wherein the hexagonal-cell honeycomb structure has an oval shape in its section normal to the direction of each cell passage and the B-axis direction of the structure is identical to the minor axis direction of the oval shape.

14. A method for fixing a hexagonal-cell honeycomb structure to a casing according to claim 10, wherein the fixing is conducted to use the hexagonal-cell honeycomb structure as a carrier for catalyst for purification of automobile exhaust gas.

15. A method for fixing a hexagonal-cell honeycomb structure to a casing according to claim 12, wherein the fixing is conducted to use the hexagonal-cell honeycomb structure as a carrier for catalyst for purification of automobile exhaust gas.

* * * * *

UNITED STATES PATENT AND TRADEMARK OFFICE
CERTIFICATE OF CORRECTION

PATENT NO.    : 6,159,578
DATED         : December 12, 2000
INVENTOR(S)   : Yukihito Ichikawa It is certified that error appears in the above-identified patent and that said Letters Patent is hereby corrected as shown below:

<u>Column 13, Line 7, through Column 14, line 19,</u>
Cancel claims 10-15 beginnining with "10. A method for" to and including "bile exhaust gas."

Signed and Sealed this

Fifteenth Day of October, 2002

*Attest:*

*Attesting Officer*

JAMES E. ROGAN
*Director of the United States Patent and Trademark Office*